United States Patent [19]
Whitehead et al.

[11] Patent Number: 6,064,784
[45] Date of Patent: May 16, 2000

[54] ELECTROPHORETIC, DUAL REFRACTION FRUSTRATION OF TOTAL INTERNAL REFLECTION IN HIGH EFFICIENCY VARIABLE REFLECTIVITY IMAGE DISPLAYS

[75] Inventors: Lorne A. Whitehead; Dmitri Nikolaevich Grandmaison; Robin John Noel Coope; Michele Ann Mossman, all of Vancouver, Canada

[73] Assignee: The University of British Columbia, Vancouver, Canada

[21] Appl. No.: 09/133,214

[22] Filed: Aug. 13, 1998

Related U.S. Application Data

[63] Continuation-in-part of application No. 08/872,161, Jun. 10, 1997, Pat. No. 5,959,777.

[51] Int. Cl.[7] ............................................. G02B 6/26
[52] U.S. Cl. ........................... 385/18; 385/16; 385/147; 385/901; 359/618
[58] Field of Search .............................. 385/16, 18, 147, 385/901, 36, 133; 359/618, 263, 831, 833; 362/554, 556, 560

[56] References Cited

U.S. PATENT DOCUMENTS

| | | |
|---|---|---|
| 3,612,653 | 10/1971 | Rajchman . |
| 3,698,793 | 10/1972 | Tellerman . |
| 4,148,563 | 4/1979 | Herbert ................................... 350/285 |
| 4,218,302 | 8/1980 | Dalisa et al. ......................... 204/299 R |
| 4,536,061 | 8/1985 | Nishimura . |
| 5,221,987 | 6/1993 | Laughlin ................................. 359/222 |
| 5,317,667 | 5/1994 | Weber et al. ........................... 385/147 |
| 5,745,632 | 4/1998 | Dreyer .................................... 385/133 |
| 5,959,777 | 9/1999 | Whitehead .......................... 385/901 X |

OTHER PUBLICATIONS

"Evanescent–wave scattering by electrophoretic microparticles: a mechanism for optical switching", Remillard et al, Applied Optics, vol. 34, No. 19, Jul. 1, 1995, pp. 3777–3785.

*Primary Examiner*—Phan T. H. Palmer
*Attorney, Agent, or Firm*—Oyen Wiggs Green & Mutala

[57] ABSTRACT

A display device and method in which electrophoresis and/or dual prismatic surfaces are used to controllably frustrate total internal reflection at an interface between materials having different refractive indices. In one embodiment, an array of solid dielectric light fibers is surrounded by an electrophoretic medium such as acetonitrile. In the absence of electrophoretic activity, the fibers totally internally reflect light which passes into the fibers, and a reflector returns the light for diffuse emission through the fibers ends. If the fibers are subjected to electrophoretic activity their TIR capability is frustrated. A second embodiment redirects light through two prismatic surfaces in a manner which permits the TIR phenomenon to occur and to be controlled at a flat surface. A third embodiment uses both electrophoresis and dual prismatic surfaces to achieve gapless control of the TIR phenomenon at a flat surface.

8 Claims, 4 Drawing Sheets

ELECTROPHORETIC, DUAL REFRACTION FRUSTRATION OF TOTAL INTERNAL REFLECTION IN HIGH EFFICIENCY VARIABLE REFLECTIVITY IMAGE DISPLAYS

REFERENCE TO RELATED APPLICATION

This is a continuation-in-part of U.S. patent application Ser. No. 08/872,161 filed Jun. 10, 1997 (hereafter "the '161 application") now U.S. Pat. No. 5,959,777.

TECHNICAL FIELD

A display device and method in which electrophoresis and/or dual prismatic surfaces are used to controllably frustrate total internal reflection at an interface between materials having different refractive indices.

BACKGROUND

The '161 application discloses a multiple pixel image display device. Each pixel has at least one element having a reflective state in which incident light undergoes total internal reflection ("TIR"), and having a non-reflective state in which TIR is prevented (i.e. "frustrated"). Such prevention is achieved by modifying the evanescent wave associated with TIR. Specifically, a member is positioned adjacent the element and deformed between first and second positions. In the first position, a gap remains between the member and the element to allow the evanescent wave to have the usual characteristics for TIR. In the second position, the member is in optical contact with the element (that is, the gap thickness is substantially less than an optical wavelength), substantially interfering with the evanescent wave, thus preventing TIR.

The present invention improves upon the invention disclosed in the '161 application. One embodiment uses electrophoresis to control the TIR phenomenon. A second embodiment redirects light through two prismatic surfaces in a manner which permits the TIR phenomenon to occur and to be controlled at a flat surface. A third embodiment uses both electrophoresis and dual prismatic surfaces to achieve gapless control of the TIR phenomenon at a flat surface.

SUMMARY OF INVENTION

In accordance with a first embodiment, the invention provides an image display device and method in which a plurality of solid dielectric light fibres extend generally parallel to one another. The fibres have first and second ends, with side walls extending between the ends. An electrophoretic medium surrounds the fibre side walls, between the ends. A plurality of particles such as silica particles are suspended in the medium. A reflector is positioned perpendicular to the fibres' first ends. A voltage source is provided to apply a voltage across the medium to electrophoretically move the particles within about 0.25 micron of an interface between the medium and the fibre side walls to frustrate total internal reflection at the interface of light rays passing into the fibres through the fibre second ends. The fibres are formed of a material having a first index of refraction and the electrophoretic medium has a second index of refraction. The first index of refraction is sufficiently larger than the second index of refraction that most of the light rays passing into the fibres undergo total internal reflection at the interface in the absence of the applied voltage.

In accordance with a second embodiment, the invention provides an image display device and method incorporating first and second sheets having prismatic outward surfaces and opposed flat surfaces. The second sheet is positioned parallel to the first sheet with the second sheet's prismatic surface adjacent the first sheet's flat surface. A member such as an elastomeric sheet is positioned adjacent the second sheet's flat surface. The member is deformable between a first position in which a gap remains between the member and the second sheet's flat surface, and a second position in which the member is in optical contact with the second sheet's flat surface. When the member is in the first position the member does not prevent total internal reflection at the second sheet's flat surface of light rays which pass through the first and second sheets. However, such total internal reflection is prevented when the member is in the second position. The respective prismatic surfaces have angular characteristics such that the first prismatic surface refracts incident light to emerge through the first sheet's flat surface at an angle at which the light passes through the second sheet's prismatic surface without substantial refraction. Preferably, the member is selectably positionable with respect to the second sheet's flat surface at a plurality of points, such that the member is in optical contact with the second sheet's flat surface at some points and not in optical contact with the second sheet's flat surface at the remaining points. Each point thus constitutes a switchable "pixel" with the pixels together forming a display.

In accordance with a third embodiment, the invention provides an image display device and method incorporating a reflective sheet having prismatic outward and inward surfaces and having an index of refraction $n_1$. A layer of a material having an index of refraction $n_2$ is bonded to the inward surface to form a generally flat rearward surface. An electrophoretic medium contacts the rearward surface, the medium having an index of refraction $n_3$. A plurality of particles such as silica particles are suspended in the medium. A voltage source applies a voltage across the medium to selectively, electrophoretically move the particles within about 0.25 micron of the rearward surface to frustrate total internal reflection at the rearward surface of light rays passing through the sheet and through the layer. The prismatic outward and inward surfaces have angular characteristics such that the outward prismatic surface refracts incident light to emerge through the inward prismatic surface at an angle at which the light passes through the layer toward the flat rearward surface without substantial refraction. $n_2$ is sufficiently larger than $n_1$, and $n_3$ is sufficiently smaller than $n_2$, that most of the light emerging through the inward prismatic surface undergoes total internal reflection at the rearward surface in the absence of the applied voltage.

DESCRIPTION

BACKGROUND

Figure 1:
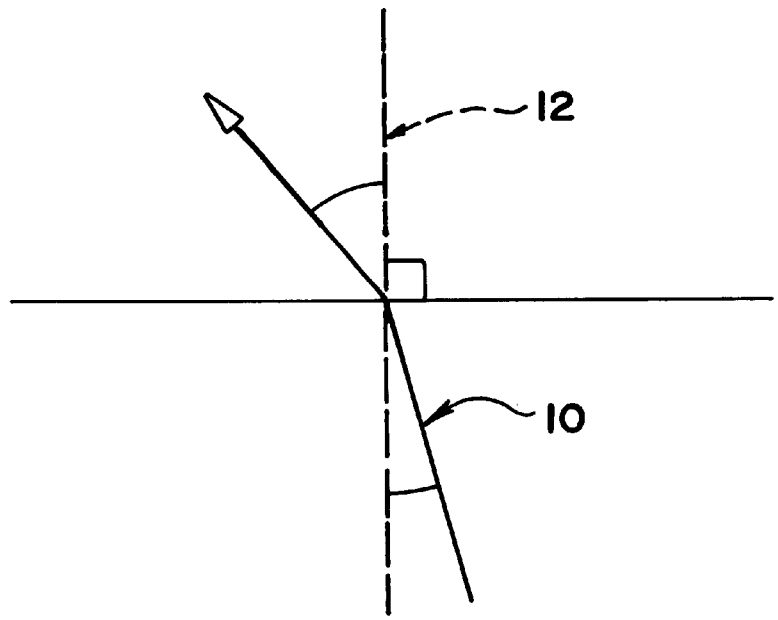
FIG. 1 schematically depicts a light ray undergoing refraction at a glass:air interface.

It is well known that light travels at different speeds in different media. The change of speed results in refraction. Snell's law characterizes the behaviour of a light ray which passes from one medium into another medium having a different index of refraction than the first medium. Specifically:

$$n_1 \sin \theta_1 = n_2 \sin \theta_2 \quad (1)$$

where, as shown in FIG. 1, $n_1$ is the index of refraction of the first medium, $n_2$ is the index of refraction of the second medium, $\theta_1$ is the angle of incidence (or refraction) within the first medium between the light ray and a normal vector to the interface between the two media, and $\theta_2$ is the angle of incidence (or refraction) within the second medium between the light ray and the normal.

As shown in FIG. 1, when light ray 10 passes from a higher refractive index medium such as glass, into a lower refractive index medium such as air, ray 10 is refracted away from normal 12. Conversely, if the direction of ray 10 is reversed, such that the ray passes from the lower index medium into the higher index medium, then the ray is refracted toward normal 12.

Thus, when ray 10 exits from the glass into the air, the refracted portion of ray 10 bends away from normal 12. The more the incident portion of ray 10 diverges from normal 12, the more the refracted portion of ray 10 diverges from the normal. Snell's law can be solved as follows to determine the angle $\theta_1$ at which the refracted portion of ray 10 exits from the glass into the air:

$$\theta_1 = \arcsin\left(\frac{n_2}{n_1}\sin\theta_2\right) \quad (2)$$

Sin $\theta_1$ increases as the incident portion of ray 10 within the glass diverges away from normal 12. The $n_2/n_1$ portion of the argument of the arcsine function exceeds 1 (i.e. for glass, $n_2 \approx 1.5$; and, for air $n_1 \approx 6$; so $n_2/n_1 \approx 1.5$). But the maximum value of the sine function is 1, so the arcsine function does not yield real values for values of $n_2/n_1 > 1$. Consequently, if $n_2/n_1 \sin\theta_2 \geq 1$ there is no solution for the refracted angle $\theta_1$. In practice, TIR occurs if $n_2/n_1 \sin\theta_2 \geq 1$ and the incident light ray is reflected back into the glass. The angle at which TIR first occurs as the refracted portion of ray 10 moves away from normal 12 is called the critical angle $\theta_c$, given by:

$$\theta_c = \arcsin\left(\frac{n_2}{n_1}\right) \quad (3)$$

Equation (3) shows that the size of the critical angle is related to the ratio of the two indices of refraction. If the difference between the two indices of refraction is relatively large, then the critical angle will be relatively small (i.e. closer to the normal) and vice versa. For purposes of the present invention, smaller critical angles are preferred since they provide a larger range of angles within which TIR may occur. This means that more incident light can be reflected, and it is consequently possible to provide a display device having an improved range of viewing angles, and/or whiter appearance, both of which are desirable characteristics.

It is well known that the incident portion of a light ray which undergoes TIR slightly penetrates the interface at which TIR occurs. This so-called "evanescent wave penetration" is of the order of about 0.25 micron for visible light. By interfering with (i.e. scattering and/or absorbing) the evanescent wave one may prevent or "frustrate" TIR.

Figure 2:
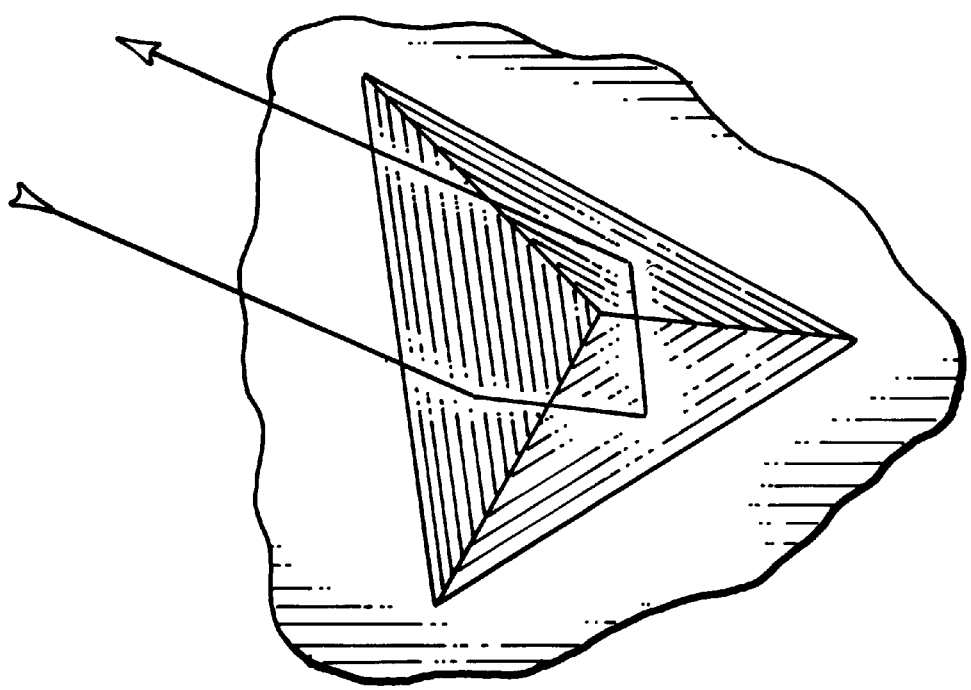
FIG. 2 is a pictorial illustration of the operation of a prior art retro-reflector.

Specifically, one may frustrate TIR by changing the index of refraction of the second medium to bring the magnitude of $n_2$ closer to the magnitude of $n_1$. For example, FIG. 2 depicts a corner reflector (also known as a "corner cube") and shows that an incident light ray undergoes TIR in each of three separate reflections at the three perpendicularly opposed facets which form the corner, with the net result that the light is retro-reflected from the corner reflector in a direction opposite to the direction of the incident ray. If the air (n≈1) outside the prismatic facet (n≈1.6) is replaced with a soft rubber gel (n≈1.4) the critical angle changes from about 38° to about 61°, preventing reflection of most of the incident light. Thus, as explained in the '161 application, TIR can be frustrated by bringing an elastomeric sheet into "optical contact" with a grouping of retro-reflective elements. Optical contact between the elastomeric sheet and the element grouping brings the elastomeric sheet substantially closer than one micron to the grouping, thereby scattering and/or absorbing the evanescent wave adjacent the grouping, thus preventing or frustrating the capability of the corner reflector grouping to totally internally reflect incident light rays.

THE INVENTION

Figure 3:
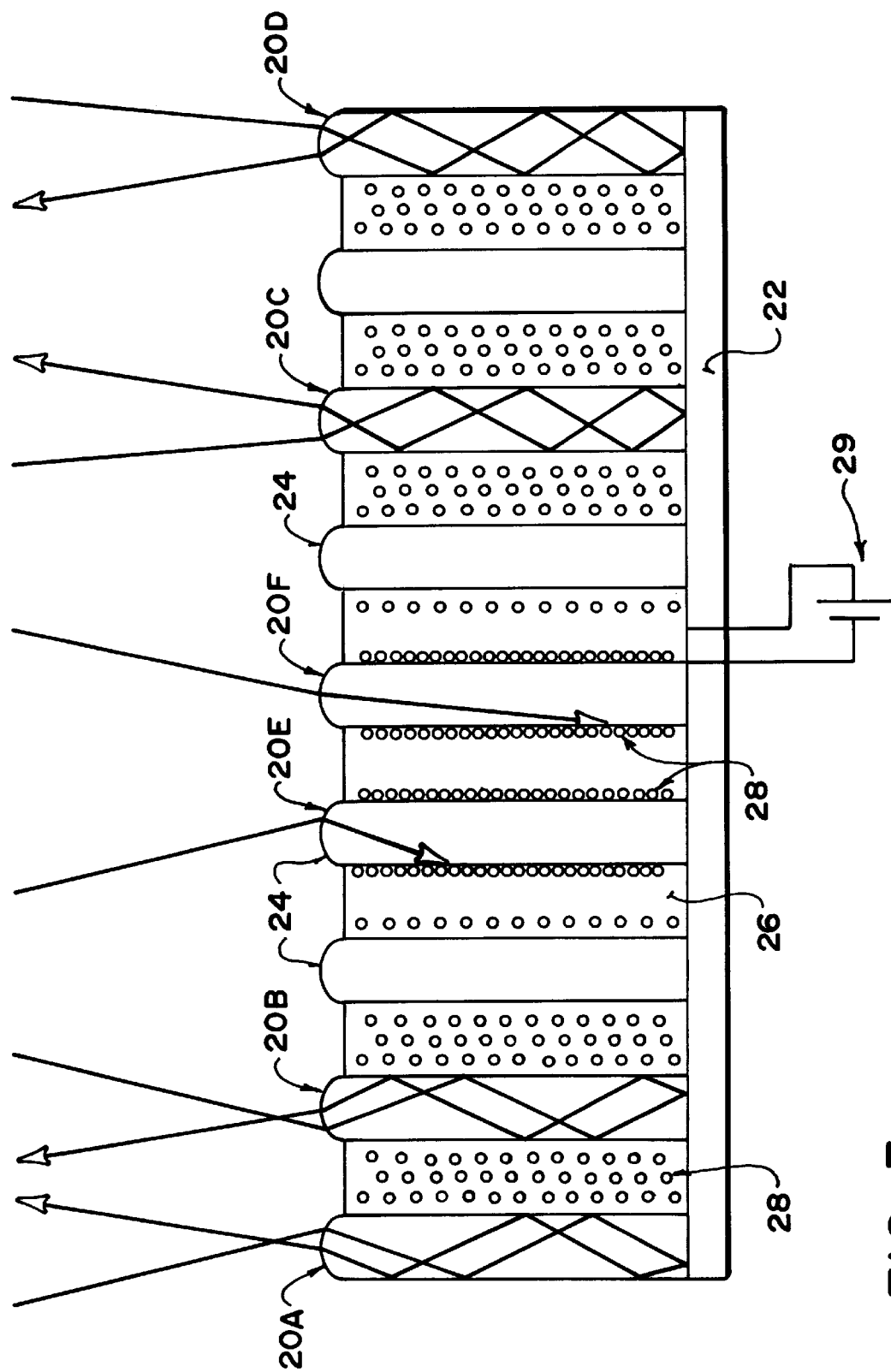
FIG. 3 depicts an array of solid dielectric light fibres mounted atop a metallic reflector and surrounded by an electrophoretic medium through which particles are selectively transported to modify the optical characteristics of the medium at the fibre side walls at which TIR normally occurs.

The first embodiment of the present invention facilitates frustration of TIR without the need for mechanical movement of a part such as the aforementioned elastomeric sheet and without the need for maintenance of a gap (i.e. a region of non-optical contact between materials having different refractive indices) whenever TIR is not to be frustrated. As shown in FIG. 3, an array of solid dielectric (i.e. polycarbonate, n≈1.6) light fibres 20A, 20B, 20C, etc. is provided atop a metallic reflector 22, with the fibres' extending generally parallel to but not touching one another, and perpendicular to reflector 22. The ends 24 of fibres 20 opposite reflector 22 have input surfaces having a small amount of curvature and/or surface texture such that incident light rays are diffused as they pass through ends 24 into fibres 20. The diffused light rays are totally internally reflected by the inner walls of the respective fibres 20. Accordingly, the light rays pass through fibres 20 to reflector 22, which reflects the rays so that they return through the respective fibres and are diffusely emitted through the fibres' ends 24, as is depicted in FIG. 3 for each of fibres 20A, 20B, 20C and 20D.

The longitudinally extending side walls of each of fibres 20, but neither of the fibres' opposed ends, are surrounded by an electrophoretic medium 26 such as acetonitrile (n≈1.34) containing a suspension of a large number of electrophoretic particles such as fine silica (n≈1.44) particles 28. "Electrophoresis" is a well known phenomenon whereby a charged species (i.e. particles, ions or molecules) moves though a medium due to the influence of an applied electric field. However, electrophoretic media (i.e. organic solvents, such as acetonitrile) have a refractive index of at least 1.33. It is thus apparent that a large refractive index ratio cannot be attained by employing electrophoretic media with conventional plastic media having refractive indices within the range of about 1.5 to 1.7 (such as polycarbonate, for which n≈1.59). Consequently, the critical angle required to achieve TIR at such an interface is high (at least 56°) and is practically unachievable with inexpensive plastic materials. These difficulties are overcome by the present invention.

In the absence of electrophoretic activity, the FIG. 3 embodiment behaves as described in the preceding paragraph, with each fibre 20 totally internally reflecting substantially all of the incident light which passes into the fibre, and reflector 22 returning the light for diffuse emission through fibre end 24. However, if one or more of fibres 20 is subjected to electrophoretic activity, as illustrated in FIG. 3 for each of fibres 20E and 20F, the TIR capability of those fibres is frustrated, preventing the incident light from reaching reflector 22 and/or preventing any incident light which may reach reflector 22 from returning for emission through end 24.

Fibres 20 are subjected to electrophoretic activity by voltage source 29 which controllably applies a voltage, typically in the range of about 10 to 100 volts, across electrophoretic medium 26. This causes silica particles 28 to move into and out of the region within about 0.25 micron of the interface at which TIR occurs, namely the longitudinally extending side walls of each of fibres 20. This frustrates TIR at the interface, by scattering caused by the refractive index difference of the silica (n≈1.5) and acetonitrile (n≈1.34).

The critical angle for the acetonitrile:polycarbonate interface is about 56°. To achieve TIR at such an interface, one must ensure that the incident light rays encounter the interface at a high angle (i.e. ≧56°). This is achieved by the embodiment of the invention depicted in FIG. 3. Fibres 20, or small groups of fibres 20, can be individually actuated, with each fibre or group of fibres constituting a separate display pixel. For example, the external side wall of each of fibres 20 can be coated with a transparent, conductive material which does not interfere with TIR, but which is able to attract electrophoretic particles 28. The conductive coatings applied to the individual fibres (or groups of fibres) are not electrically connected to the coatings of adjacent fibres (or groups of fibres). Accordingly, each fibre (or group of fibres) can be separately actuated by applying an appropriate electronic control signal to the fibre's coating.

The FIG. 3 embodiment ensures that incident light rays encounter the acetonitrile:polycarbonate interface at a high angle, because the refraction which occurs when a light ray enters one of fibre ends 24 causes the transmitted ray to be farther from a vector which is normal to the fibres' side walls than was originally the case. Further, because the diameter of fibres 20 is much smaller than the fibres' length, the FIG. 3 embodiment also ensures that each light ray undergoes multiple reflections at the interface, thus increasing the number of opportunities for frustrating TIR as the light rays pass through fibres 20.

Figure 4:
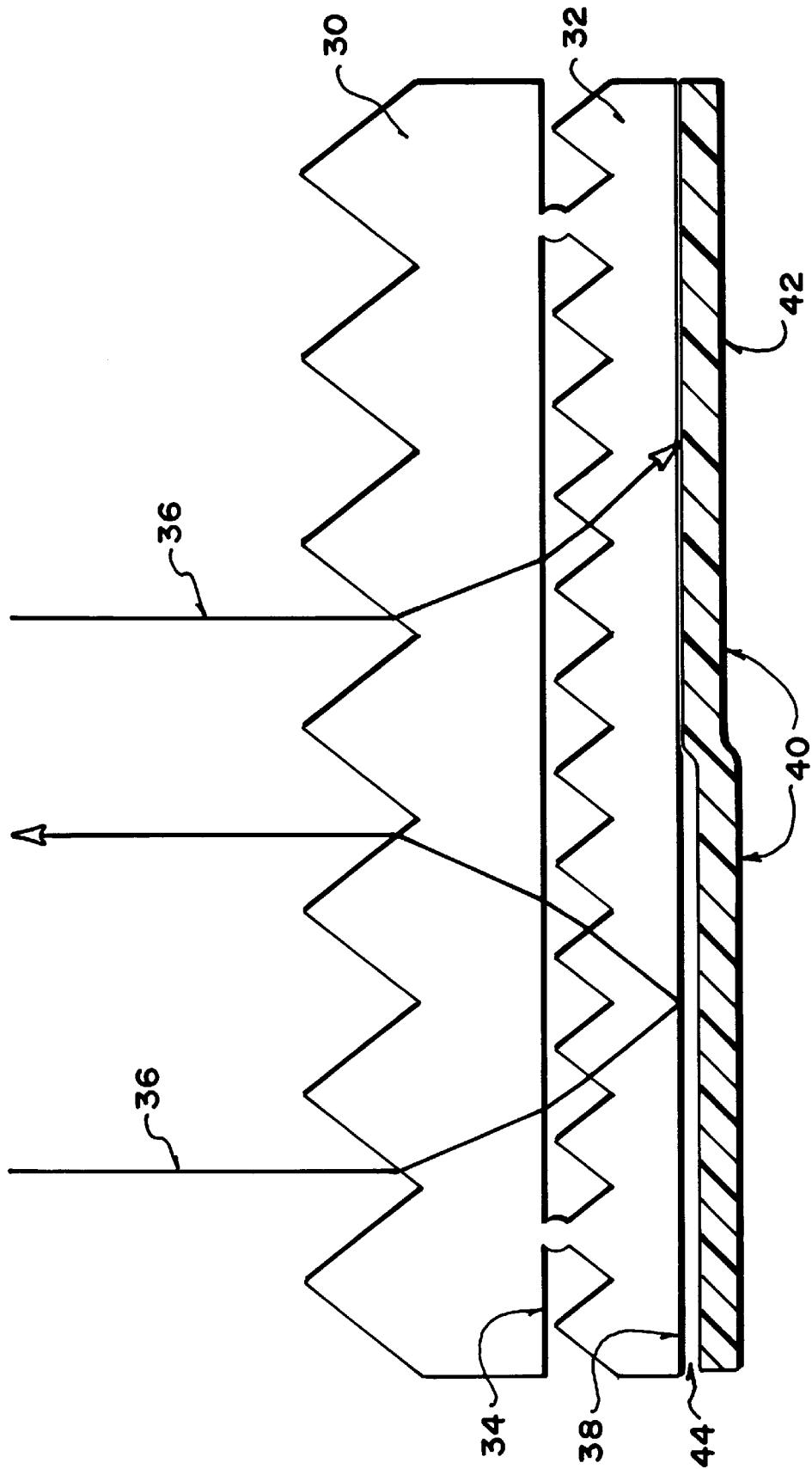
FIG. 4 depicts two parallel sheets of reflective prismatic material positioned such that light rays incident upon the prismatic outward surface of the first sheet are refracted by both sheets to achieve TIR at the second sheet's flat rearward surface, simplifying frustration of TIR at that surface.

The second embodiment of the present invention is depicted in FIG. 4. The objective here is to achieve and controllably frustrate TIR at a flat surface. Because the surface is flat, it is easier to achieve optical contact between the surface and a control means such as an elastomeric sheet, thus simplifying frustration of TIR at the flat surface. The prismatic surface structure of the corner reflector grouping disclosed in the '161 application makes it comparatively difficult to attain the alignment accuracy required to achieve optical contact.

As depicted in FIG. 4, first and second sheets 30, 32 of prismatic sheeting material such as 3M Diamond Grade™ reflective sheeting are positioned parallel to one another, with the prisms on first sheet 30 facing outwardly and the prisms on second sheet 32 facing the flat inward surface 34 of first sheet 30. Preferably, the prisms on sheet 30 have substantially different pitch and/or angle than the prisms on sheet 32 to minimize moire effects in the optical interaction of the two sheets. An incident light ray 36 which encounters first sheet 30 is initially refracted by about 45° and emerges through flat surface 34 to encounter second sheet 32 which, by virtue of its prismatic facets, allows the light to enter sheet 32 substantially without the refraction that would occur at a flat interface. Thus, within sheet 32, ray 36 also extends at about a 45° angle relative to flat surfaces 34, 38 and is thus beyond the critical angle (which is about 38° for a polycarbonate:air interface at flat surface 38). Neither one of sheets 30, 32 alone is capable of refracting the light sufficiently to achieve TIR at either of the sheets' respective flat surfaces 34 or 38. But, the combined refraction of the two sheets is sufficient to redirect light rays incident upon the prismatic outward surface of sheet 30 within a range of angles for which the refracted rays undergo TIR at flat surface 38 of second sheet 32.

It is much easier to bring elastomeric sheet 40 into optical contact with flat surface 38 (as seen at 42 in FIG. 4) than with a prismatic surface. Accordingly, image display devices of the type described in the '161 application can be formed more readily and inexpensively, and operated more reliably. In particular, elastomeric sheet 40 can be selectably actuated at different points over its surface to bring sheet 40 into optical contact with surface 38 at some points, while leaving sheet 40 free of optical contact with surface 38 at other points, with each point thus constituting a switchable "pixel" to form a display. For example, in FIG. 4, the right half of sheet 40 is depicted in optical contact with surface 38, whereas the left half of sheet 40 is depicted with an air gap 44 between sheet 40 and surface 38 (i.e. over the left half of sheet 40 there is no optical contact with surface 38).

Figure 5:
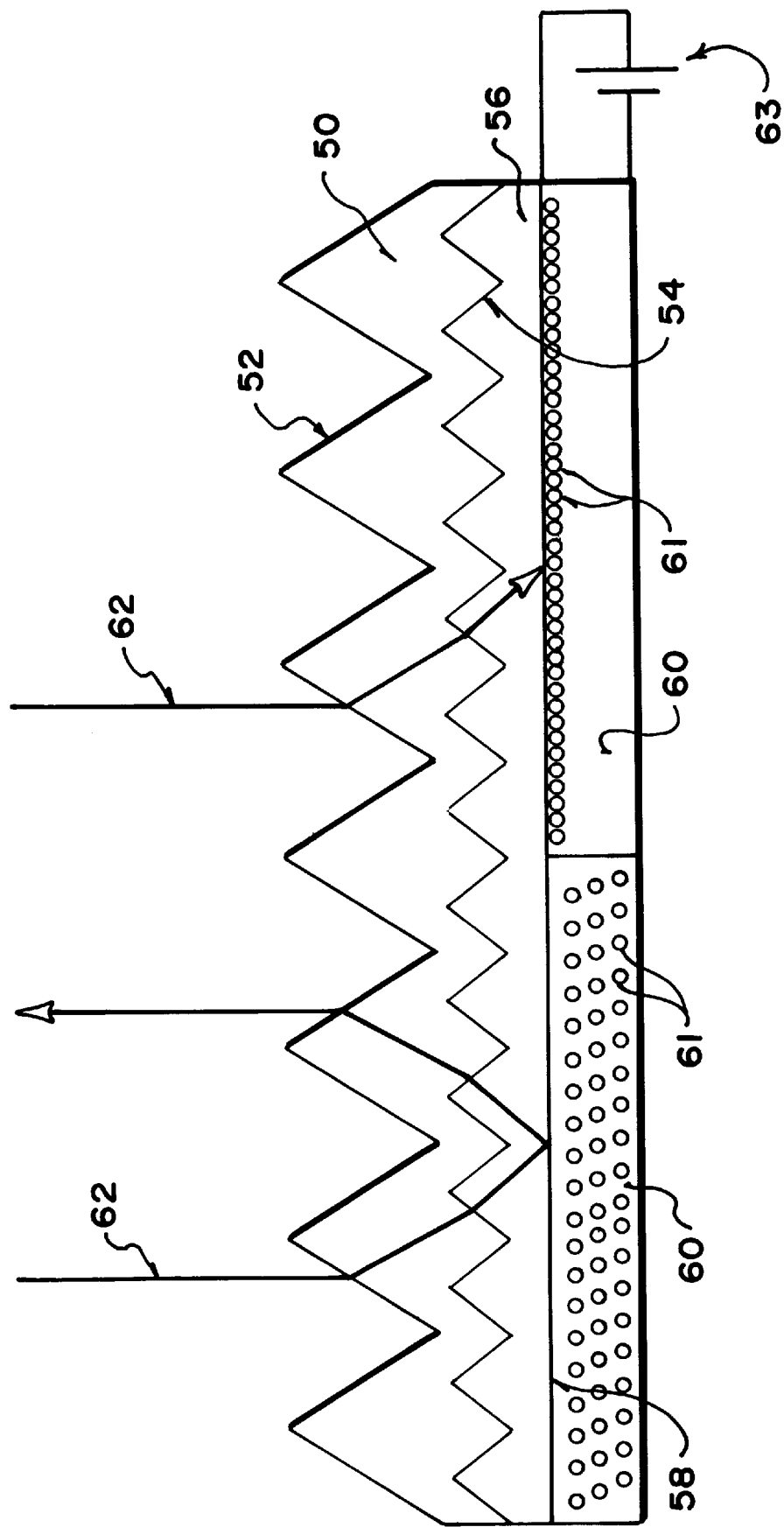
FIG. 5 depicts a sheet of reflective material having prisms on both sides, with a thin layer of high refractive index material bonded to the prisms on one side forming a flat surface which contacts an electrophoretic medium to achieve controllable frustration of TIR at that surface without the need for an air gap.

The third embodiment of the present invention is depicted in FIG. 5. This embodiment combines features of the previously described embodiments to achieve controllable frustration of TIR at a flat surface without the need for an air gap such as gap 44 depicted in the FIG. 4 embodiment. In the FIG. 5 embodiment, an upper sheet 50 of low refractive index material such as polycarbonate (n≈1.6) is bonded to a lower layer 56 of high refractive index material such as zinc sulphide, niobium pentoxide, titanium dioxide, etc. (n≈2.2). Upper sheet 50 bears a first series of prisms 52 on its outward surface and a second series of prisms 54 on its inward surface. There is no unique or optimum shape for prisms 52, 54. A wide range of prism or near-prism shapes will suffice, provided that the first series of prisms 52 are capable of deflecting light to an angle for which TIR will occur at flat surface 58 of the higher refractive index layer 56, and provided that the second series of prisms 54 are angled such that light passes through them at roughly normal incidence so that little light deflection occurs within layer 56. In the example shown, prisms 52 are inclined at an angle of about 15° relative to a vector normal to flat surface 58, and prisms 54 are inclined at an angle of about 45° relative to the same normal.

Layer 56 may comprise a thin layer of high refractive index material (zinc sulphide, niobium pentoxide, titanium dioxide, etc.) sputtered or otherwise bonded onto the inward surface of sheet 50 bearing prisms 54. Prisms 54 need only be about 2 microns deep. Layer 56 need only be sufficiently thick (i.e. about 5–10 microns) to facilitate provision of a generally but not perfectly flat rearward surface 58.

An electrophoresis medium 60 such as acetonitrile (n≈1.34) containing a finely divided suspension of particles 61 such as silica particles (n≈1.44) is placed in contact with rearward surface 58. In the absence of electrophoretic activity (i.e. as illustrated for the left side of medium 60 depicted in FIG. 5), an incident light ray 62 which encounters upper sheet 50 is initially refracted by prisms 52 and is then emitted through prisms 54 into layer 56 without further substantial deflection. TIR occurs at flat rearward surface 58 because, for the aforementioned FIG. 5 example, the ray is emitted into layer 56 at an angle of about 40°, which is beyond the 37° critical angle for a zinc sulphide:acetonitrile interface such as that preferably provided at flat rearward surface 58. After undergoing TIR at flat rearward surface 58, the ray is re-emitted through prisms 54 into upper sheet 50, again without further substantial deflection. Prisms 52 then refract the ray as it emerges through the polycarbonate:air interface atop upper sheet 50 in a direction which is nearly 180° opposite to the direction of the original incident ray 62.

Neither sheet 50 nor layer 56 alone are capable of refracting the light sufficiently to achieve this overall reversal of ray direction. But, the combined refraction of sheet 50 and layer 56 is sufficient to redirect light rays incident upon prisms 52 within a range of angles for which the redirected rays undergo TIR at flat surface 58, and to return the reflected rays in a direction nearly opposite to the direction of the incident ray, thus achieving a "white" appearance in the reflected light.

If electrophoresis medium 60 is activated by actuating voltage source 63 to apply a voltage across medium 60, as illustrated for the right half of medium 60 depicted in FIG. 5, the suspended silica particles 61 move to within about 0.25 micron of the TIR interface (i.e. flat surface 58) as shown on the right side of FIG. 5. This frustrates TIR at the interface, as light is scattered off the surface of the silica particles due to the refractive index mismatch at the particulate interface.

Accordingly, the FIG. 5 embodiment provides a flat electrophoretic interface. The optical characteristic of electrophoretic medium 60 in the evanescent wave region at the flat surface TIR interface 58 can be controlled electronically by applying a potential difference across the medium. This may for example be accomplished by applying transparent electrodes (not shown) to flat surface 58, with the electrodes being segmented to facilitate control of individual "pixels", thus forming an image display.

As will be apparent to those skilled in the art in the light of the foregoing disclosure, many alterations and modifications are possible in the practice of this invention without departing from the scope thereof. In particular, a very wide range of mechanical actuation methods can be used to move elastomeric sheet 40 between optical contact and non-optical contact positions relative to flat surface 38 in the FIG. 4 embodiment; and, a very wide range of electrophoretic media and electrophoretic particles can be employed in either of the FIG. 3 or FIG. 5 embodiments. Accordingly, the scope of the invention is to be construed in accordance with the substance defined by the following claims.

What is claimed is:

1. An image display device, comprising:
   (a) a plurality of generally parallel, longitudinally extending solid dielectric light fibres, each of said fibres having a first end, a second end and a side wall extending between said first and second ends;
   (b) an electrophoretic medium surrounding said fibre side walls, between said first and second ends;
   (c) a plurality of particles suspended in said medium;
   (d) a reflector positioned perpendicular to said fibre first ends;
   (e) means for applying a voltage across said medium to electrophoretically move said particles within about 0.25 micron of an interface between said medium and said fibre side walls to frustrate total internal reflection at said interface of light rays passing into said fibres through said fibre second ends;

wherein:
   (i) said fibres are formed of a material having a first index of refraction;
   (ii) said electrophoretic medium has a second index of refraction; and,
   (iii) said first index of refraction is sufficiently larger than said second index of refraction that most of said light rays passing into said fibres undergo total internal reflection at said interface in the absence of said applied voltage.

2. An image display device as defined in claim 1, wherein:
   (a) said first index of refraction is within the range of about 1.5 to 1.7; and,
   (b) said second index of refraction is within the range of about 1.3 to 1.4.

3. An image display device, comprising:
   (a) a first sheet having a prismatic outward surface and an opposed flat surface;
   (b) a second sheet having a prismatic outward surface and an opposed flat surface, said second sheet positioned parallel to said first sheet with said second sheet prismatic surface adjacent said first sheet flat surface; and,
   (c) a member positioned adjacent said second sheet flat surface, said member deformable between a first position in which a gap remains between said member and said second sheet flat surface and a second position in which said member is in optical contact with said second sheet flat surface, said member not preventing total internal reflection at said second sheet flat surface of light rays passing through said first and second sheets in said first position, said member preventing said total internal reflection in said second position;

wherein said first and second sheet prismatic surfaces have angular characteristics such that said first prismatic surface refracts incident light to emerge through said first sheet flat surface at an angle at which said light passes through said second prismatic surface without substantial refraction.

4. An image display device as defined in claim 3, wherein said member is selectably positionable with respect to said second sheet flat surface at a plurality of points such that said member is in optical contact with said second sheet flat surface at some of said points and not in optical contact with said second sheet flat surface at the remainder of said points.

5. An image display device, comprising:
   (a) a reflective sheet having prismatic outward and inward surfaces, said sheet having an index of refraction $n_1$;
   (b) a layer of a material having an index of refraction $n_2$ bonded to said inward surface to form a generally flat rearward surface;
   (c) an electrophoretic medium contacting said rearward surface, said medium having an index of refraction $n_3$;
   (d) a plurality of particles suspended in said medium;
   (e) means for applying a voltage across said medium to selectively, electrophoretically move said particles within about 0.25 micron of said rearward surface to frustrate total internal reflection at said rearward surface of light rays passing through said sheet and through said layer;

wherein:

(i) said prismatic outward and inward surfaces have angular characteristics such that said outward prismatic surface refracts incident light to emerge through said inward prismatic surface at an angle at which said light passes through said layer toward said flat rearward surface without substantial refraction; and, (ii) $n_2$ is sufficiently larger than $n_1$, and $n_3$ is sufficiently smaller than $n_2$, that most of said light emerges through said inward prismatic surface undergoes total internal reflection at said rearward surface in the absence of said applied voltage.

6. An image display method, comprising the steps of:

(a) arranging a plurality of solid dielectric light fibres in generally parallel, longitudinally extending relation to one another, each of said fibres having a first end and a second end, said fibres formed of a material having a first index of refraction;

(b) surrounding said fibres with an electrophoretic medium between said first and second ends, said medium having a second index of refraction;

(c) suspending a plurality of particles in said medium;

(d) positioning a reflector perpendicular to said fibres' first ends; and, (e) selectively applying a voltage across said medium to electrophoretically move said particles within about 0.25 micron of an interface between said medium and said fibres to frustrate total internal reflection at said interface of light rays passing into said fibres through said fibres' second ends;

wherein said first index of refraction is sufficiently larger than said second index of refraction that most of said light rays passing into said fibres undergo total internal reflection at said interface in the absence of said applied voltage.

7. An image display method, comprising the steps of:

(a) positioning a first reflective sheet having a prismatic outward surface and an opposed flat surface parallel to a second reflective sheet having a prismatic outward surface and an opposed flat surface, with said second sheet prismatic surface adjacent said first sheet flat surface; and, (b) positioning a deformable member adjacent said second sheet flat surface; and, (c) controllably deforming said member between a first position in which a gap remains between said member and said second sheet flat surface and a second position in which said member is in optical contact with said second sheet flat surface, said member not preventing total internal reflection at said second sheet flat surface of light rays passing through said first and second sheets in said first position, said member preventing said total internal reflection in said second position;

wherein said first and second sheet prismatic surfaces have angular characteristics such that said first prismatic surface refracts incident light to emerge through said first sheet flat surface at an angle at which said light passes through said second prismatic surface without substantial refraction.

8. An image display method, comprising the steps of:

(a) providing a reflective sheet having a prismatic outward and inward surfaces, said sheet having an index of refraction $n_1$;

(b) bonding a layer of a material having an index of refraction $n_2$ to said inward surface to form a generally flat rearward surface;

(c) contacting said rearward surface with an electrophoretic medium having an index of refraction $n_3$;

(d) suspending a plurality of particles in said medium;

(e) applying a voltage across said medium to selectively, electrophoretically move said particles within about 0.25 micron of said rearward surface to frustrate total internal reflection at said rearward surface of light rays passing through said sheet and through said layer;

wherein:

(i) said prismatic outward and inward surfaces have angular characteristics such that said outward prismatic surface refracts incident light to emerge through said inward prismatic surface at an angle at which said light passes through said layer toward said flat rearward surface without substantial refraction; and, (ii) $n_2$ is sufficiently larger than $n_1$, and $n_3$ is sufficiently smaller than $n_2$, that most of said light emerges through said inward prismatic surface undergoes total internal reflection at said rearward surface in the absence of said applied voltage.

* * * * *

UNITED STATES PATENT AND TRADEMARK OFFICE
CERTIFICATE OF CORRECTION

PATENT NO : 6,064,784
DATED : 16 May, 2000
INVENTOR(S): Lorne A. Whitehead; Dmitri Nikolaevich Grandmaison; Robin John Noel Coope; Michele Ann Mossman It is certified that error appears in the above-identified patent and that said Letters Patent is hereby corrected as shown below:

In the Drawings:

- Figure 1: add symbols $\Theta_1$, $\Theta_2$, $n_1$ and $n_2$ so that Figure 1 appears as shown below:

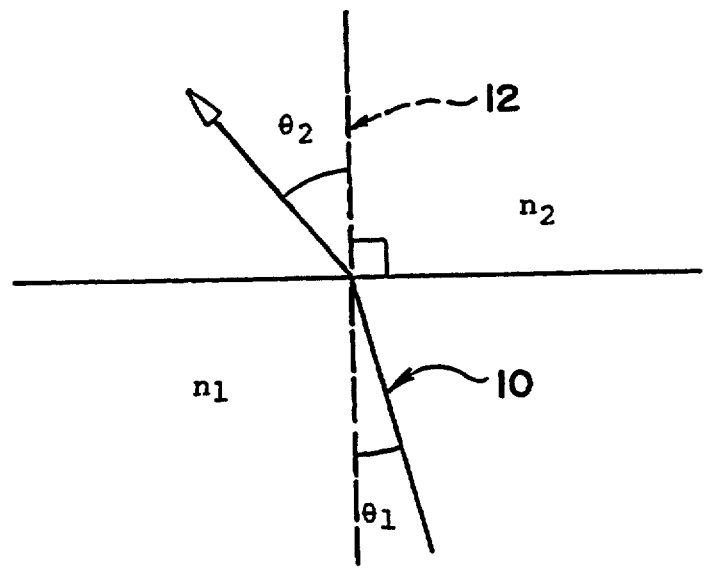

FIGURE 1                                    PRIOR ART

UNITED STATES PATENT AND TRADEMARK OFFICE
CERTIFICATE OF CORRECTION

PATENT NO : 6,064,784
DATED : 16 May, 2000
INVENTOR(S): Lorne A. Whitehead; Dmitri Nikolaevich Grandmaison; Robin John Noel Coope; Michele Ann Mossman It is certified that error appears in the above-identified patent and that said Letters Patent is hereby corrected as shown below:

- column 3, line 39, change "$\Theta_1$" to --$\Theta_2$--.

- column 3, line 42, delete equation (2) and substitute:

$$\theta_2 = \arcsin(\frac{n_1}{n_2}\sin\theta_1) \qquad (2)$$

- column 3, line 46, change "$n_2/n_1$" to --$n_1/n_2$--.

- column 3, line 48, change "$n_2 \approx 1.5$" to --$n_1 \approx 1.5$--; and, change "air $n_1 26$" to --air $n_2 \approx 1$--; and, change "$n_2/n_1$" to --$n_1/n_2$--.

- column 3, line 50, change "values of $n_2/n_1 > 1$" to --arguments greater than 1--.

- column 3, line 51, change "$n_2/n_1 \sin\Theta_2$" to --$n_1/n_2 \sin\Theta_1$--; and, change "angle $\Theta_1$" to --angle $\Theta_2$--.

- column 3, line 52, change "$n_2/n_1 \sin\Theta_2$" to --$n_1/n_2 \sin\Theta_1$--.

UNITED STATES PATENT AND TRADEMARK OFFICE
CERTIFICATE OF CORRECTION

PATENT : 6,064,784
DATED : 16 May, 2000
INVENTOR(S): Lorne A. Whitehead; Dmitri Nikolaevich Grandmaison; Robin John Noel Coope; Michele Ann Mossman It is certified that error appears in the above-identified patent and that said Letters Patent is hereby corrected as shown below:

Column 3, line 62, change "indices of refraction." to --indices of refraction $n_1$, $n_2$.--.

Signed and Sealed this

Twentieth Day of March, 2001

Attest:

NICHOLAS P. GODICI

*Attesting Officer*   *Acting Director of the United States Patent and Trademark Office*